United States Patent
Yao et al.

(10) Patent No.: US 11,194,616 B2
(45) Date of Patent: Dec. 7, 2021

(54) METHOD, APPARATUS AND SYSTEM FOR SIMULTANEOUSLY TRANSMITTING OR RECEIVING MULTIPLE MANAGED OBJECTS

(71) Applicant: Alcatel Lucent, Boulogne Billancourt (FR)

(72) Inventors: Deyi Yao, Shanghai (CN); Yi Song, Shanghai (CN); Weisi Xiao, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 389 days.

(21) Appl. No.: 14/356,981

(22) PCT Filed: Oct. 25, 2012

(86) PCT No.: PCT/IB2012/002540
§ 371 (c)(1),
(2) Date: May 8, 2014

(87) PCT Pub. No.: WO2013/068837
PCT Pub. Date: May 16, 2013

(65) Prior Publication Data
US 2014/0297801 A1   Oct. 2, 2014

(30) Foreign Application Priority Data
Nov. 9, 2011 (CN) .......................... 201110353690.5

(51) Int. Cl.
*G06F 9/46* (2006.01)
*H04L 12/24* (2006.01)
*H04L 29/08* (2006.01)

(52) U.S. Cl.
CPC .......... *G06F 9/466* (2013.01); *H04L 41/0273* (2013.01); *H04L 41/0863* (2013.01); *H04L 67/10* (2013.01)

(58) Field of Classification Search
CPC ......... G06F 9/466; G06F 15/173; H04L 67/10
(Continued)

(56) References Cited

U.S. PATENT DOCUMENTS

| | | | |
|---|---|---|---|
| 6,253,254 B1 * | 6/2001 | Erlenkoetter | G06F 17/30893 707/999.01 |
| 6,539,398 B1 * | 3/2003 | Hannan | G06F 16/00 |

(Continued)

OTHER PUBLICATIONS

3GPP TS 32.607 "3rd Generation Partnership Project; Technical Specification Group Services and System Aspects; Telecommunication management; Configuration Management (CM); Basic CM Integration Reference Point (IRP); SOAP Solution Set (SS) (Release 9);" V9.1.0, Oct. 6, 2010, pp. 1-24.*

(Continued)

*Primary Examiner* — Backhean Tiv
(74) *Attorney, Agent, or Firm* — Fay Sharpe LLP (57) ABSTRACT

The present invention relates to a method for simultaneously transmitting and receiving multiple managed objects in order to compensate for the inadeguacies of the current 3GPP TS32.607 standard, characterized in that, the method comprises: encapsulating two or more managed objects in one or more atomic transactions according to internal attributes and data processing of the managed objects, wherein each atomic transaction includes at least two managed objects; according to a pre-defined association rule, determining association relationships between managed objects in the one atomic transaction, or determining association relationships between multiple atomic transactions and association relationships between managed objects in each of the multiple atomic transactions; and transmitting one or more atomic transactions through a communication network.

12 Claims, 5 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 7,236,967 | B2* | 6/2007 | Hogan | G06F 9/466 |
| | | | | 707/683 |
| 7,321,968 | B1* | 1/2008 | Capellaro | H04L 29/06 |
| | | | | 713/152 |
| 7,580,994 | B1 | 8/2009 | Fiszman et al. | |
| 8,667,083 | B2* | 3/2014 | Ghosh | G06Q 10/00 |
| | | | | 709/217 |
| 9,110,712 | B2* | 8/2015 | Kalavacharla | G06F 16/90 |
| 2005/0108387 | A1 | 5/2005 | Li et al. | |
| 2005/0125772 | A1* | 6/2005 | Kohno | G06F 8/70 |
| | | | | 717/104 |
| 2005/0243333 | A1* | 11/2005 | Ternasky | G06F 3/1207 |
| | | | | 358/1.2 |
| 2006/0004882 | A1* | 1/2006 | Itikarlapalli | G06F 11/006 |
| 2006/0230078 | A1* | 10/2006 | McConaughy | H04L 67/1095 |
| 2006/0282400 | A1* | 12/2006 | Kalavacharla | G06F 16/1834 |
| 2007/0198518 | A1* | 8/2007 | Luchangco | G06F 16/2315 |
| 2008/0172675 | A1* | 7/2008 | Mikalsen | G06F 9/44526 |
| | | | | 719/313 |
| 2009/0012920 | A1* | 1/2009 | Kwok | G06N 3/004 |
| | | | | 706/12 |
| 2009/0282410 | A1* | 11/2009 | Moir | G06F 8/443 |
| | | | | 718/101 |
| 2012/0331471 | A1* | 12/2012 | Ramalingam | G06F 11/1474 |
| | | | | 718/102 |
| 2013/0060742 | A1* | 3/2013 | Chang | G06F 16/2336 |
| | | | | 707/704 |
| 2013/0086204 | A1* | 4/2013 | Ghosh | G06F 8/31 |
| | | | | 709/217 |
| 2014/0297801 | A1* | 10/2014 | Yao | G06F 9/466 |
| | | | | 709/217 |
| 2014/0337393 | A1* | 11/2014 | Burchall | G06F 16/2336 |
| | | | | 707/826 |
| 2015/0296018 | A1* | 10/2015 | Dondini | H04L 45/72 |
| | | | | 709/213 |

OTHER PUBLICATIONS

GSM, 3GPP TS 32.607 v7.1.0 3rd Generation Partnership Project; Technical Specification Group Services and System Aspects; Telecommunication management; Configuration Management(CM); Basic CM Intergration Reference Point(IRP):SOAP Solution Set(SS), Release 7, Dec. 2008, pp. 1-24.*
GSM, 3GPP TS 32.602 v4.3.0 3rd Generation Partnership Project; Technical Specification Group Services and System Aspects; Telecommunication management; Configuration Management(CM); Basic CM Intergration Reference Point(IRP):SOAP Solution Set(SS), Release 4, Mar. 2004, pp. 1-17.*
W3C, Simple Object Access Protocol(SOAP) 1.1, May 8, 2000, pp. 1-32.*
Su-Cheng Haw et al., Data storage practices and query processing in XML databases: A survey, Knowledge-Based Systems, vol. 24, No. 8, pp. 1317-1340, XP028252637, Jun. 13, 2011.
$3^{rd}$ Generation Partnership Project; Technical Specification Group Services and System Aspects; Telecommunication management; Configuration Management (CM); Basic CM Integration Reference Point (IRP); SOAP Solution Set (SS) (Release 9), 3GPP TS 32.607 V9.1.0, pp. 1-24, XP050461843, Sep. 2010.
International Search Report for PCT/IB2012/002540 dated Mar. 27, 2013.

* cited by examiner

METHOD, APPARATUS AND SYSTEM FOR SIMULTANEOUSLY TRANSMITTING OR RECEIVING MULTIPLE MANAGED OBJECTS

FIELD OF THE INVENTION

The present invention relates to the field of communication technologies, and more particularly, to a method, apparatus and system for simultaneously transmitting or receiving multiple managed objects, and to a transmitting apparatus for simultaneously transmitting multiple managed objects and a receiving apparatus for simultaneously receiving multiple managed objects.

BACKGROUND OF THE INVENTION

Currently, according to the standard TS32.607 of the 3rd Generation Partnership Project 3GPP, only one Managed Object (MO) can be created in a Simple Object Access Protocol (SOAP) Configuration Management (CM) request message. Where, a managed object contains one or more internal attributes and one or more data processing. Generally, one SOAP CM request message is defined as an atomic transaction at the network side.

In many large and/or critical applications, computers perform a large number of tasks every second. More often, computers not only perform individual tasks but also combine these tasks together to complete one service requirement, called a transaction. If one task can be successfully performed while an error occurs in the second or third associated task, this error is very likely to make the system in an inconsistent state. At this time the transaction will become very important and it can make the system get rid of this inconsistent state.

A transaction is one smallest working unit, operating unit or processing unit, and works, operates or is processed as a whole regardless of whether the transaction is executed successfully or not. As a whole, there will not be a transaction that is completed partly. A transaction may consist of multiple tasks, and if one transaction is executed successfully as a whole, then each task in the transaction must be executed successfully. If a part (e.g., one or more tasks) of the transaction fails, then the entire transaction fails.

When a transaction failed, the system returns to a state before the start of the transaction. Such process of canceling all changes is known as "rollback". For example, if one transaction successfully updates two database tables but fails to update a third database table, the system will restore the previous two successful updates (i.e., eliminate the effect of the previous two successful updates on the database tables), and return to the original state before the execution of the transaction.

The key to any application is to ensure that all operations it executes are correct, and if the application only completes operations partially, then data in the application, even the entire system, will be in an inconsistent state. In a practical application, for example, a user terminal needs to modify two parameter values on an application server, increase one by 1 and reduce the other by 1, to keep the sum of the two parameter values unchanged. When the user terminal increases one of the parameter values by 1 successfully while failing to reduce the other by 1, the sum of the two parameter values is actually increased by 1. Thus, data in this application is wrong and loses its integrity, in other words, the sum of the parameter values would increase somehow.

In sequence to overcome such errors, there are two methods currently.

In a traditional mode, operation failure in any way must be prevented. For any point of failure, developers must add measures supporting the application to return to the state before the start of the operation. In other words, developers must add control to enable the system to restore when an error occurs during operation (revoke completed operations).

A simpler method is to operate within an environment of a transaction processing system, and the task of a transaction processing system is to ensure that the entire transaction is either completely successful or to do nothing. If all tasks of the transaction are completed successfully, then the change in the application will be submitted to the system and the system will process a next transaction. If a certain part in the operation can not be completed successfully, this will make the system be in an invalid state, the change of the system should be rolled back, and the application procedure will return to its previous state.

The ability of the transaction processing system is to embed the technology of completing these operations into the system. Another benefit of the transaction processing system is that it has ACID attributes, that is, when the transaction processing system creates a transaction, it will ensure that the transaction has certain properties. These properties are known as ACID properties. ACID is: Atomicity, Consistency, Isolation and Durability.

1. Atomicity

Atomicity attribute is used to identify whether a transaction is fully completed. Any update of a transaction is to be completed fully on the system. For an error due to some reason, the transaction can not complete all of its tasks, the system will return to a state before the start of the transaction.

2. Consistency

Consistency of transaction executed in system integrity is implemented by ensuring that any transaction of the system is in a valid state finally. If a transaction is successfully completed, then all the changes in the system will be applied correctly and the system is in a valid state. If an error occurs in a transaction, all changes in the system will automatically roll back, and the system will return to its original state. Because the system is in a consistent state when the transaction begins, the system is now still in a consistent state.

3. Isolation

Transactions are executed in an isolated sate so that they look like unique operation executed by the system within given time. If there are two transactions running at the same time and executing the same function, isolation of transaction will ensure that each transaction in the system believes that only that transaction is using the system.

4. Durability

Durability means that once the transaction is executed successfully, all changes generated in the system will be permanent. There should be some check points to prevent the loss of information when the system fails. Even if hardware itself fails, the state of the system can still be rebuilt by the task of recording the completion of transaction in the log. The concept of durability allows developers to believe that no matter what changes occur in the system thereafter, completed transactions are a permanent part of the system.

However, there is still not a technology of encapsulating multiple managed objects into one message in the prior art, i.e., multiple managed objects cannot be simultaneously transmitted or received. Therefore, an object of the present invention is to provide a method, apparatus or system to solve the above problems.

SUMMARY OF THE INVENTION

In order to solve the above problems in the 3GPP TS32.607, according to a first aspect of the present invention, there is provided a method for simultaneously transmitting multiple managed objects, characterized in that, the method comprises: encapsulating two or more managed objects in one or more atomic transactions according to internal attributes and data processing of the managed objects, wherein each atomic transaction includes at least two managed objects; according to a pre-defined association rule, determining association relationships between managed objects in the one atomic transaction, or determining association relationships between multiple atomic transactions and association relationships between managed objects in each of the multiple atomic transactions; and transmitting one or more atomic transactions through a communication network.

According to a second aspect of the present invention, there is provided a method for simultaneously receiving multiple managed objects, characterized in that, the method comprises: receiving one or more atomic transactions through a communication network, wherein each atomic transaction includes at least two managed objects; according to a pre-defined association rule, determining association relationships between managed objects in one atomic transaction, or determining association relationships between multiple atomic transactions and association relationships between managed objects in each of the multiple atomic transactions; and executing one or more atomic transactions according to the association relationships.

According to a third aspect of the present invention, there is provided a method for simultaneously transmitting or receiving multiple managed objects in a communication system, characterized by comprising:

At the transmitting side, encapsulating two or more managed objects in one or more atomic transactions according to internal attributes and data processing of the managed objects, wherein each atomic transaction includes at least two managed objects; according to a pre-defined association rule, determining association relationships between managed objects in the one atomic transaction, or determining association relationships between multiple atomic transactions and association relationships between managed objects in each of the multiple atomic transactions; and transmitting one or more atomic transactions through a communication network;

At the receiving side, receiving one or more atomic transactions through a communication network, wherein each atomic transaction includes at least two managed objects; according to a pre-defined association rule, determining association relationships between managed objects in the one atomic transaction, or determining association relationships between multiple atomic transactions and association relationships between managed objects in each of the multiple atomic transactions; and executing one or more atomic transactions according to the association relationships.

Preferably, wherein, the internal properties of the managed objects include resource identification and/or internal data structure.

Preferably, wherein, data processing of the managed objects is an operation that can be executed on resources and/or an operation executed according to the internal data structure.

Preferably, further comprises transmitting one or more atomic transactions through a single simple object access protocol message via a communication network.

Preferably, further comprises using eXtensible Markup Language in a single simple object access protocol message to mark: (1) association relationships between managed objects in atomic transactions; or (2) management relationships between atomic transactions and association relationships between managed objects in the atomic transactions.

Preferably, further comprises receiving a single simple object access protocol message via a communication network, wherein the single simple object access protocol message comprises one or more atomic transactions.

Preferably, further comprises determining, according to marks in eXtensible Markup Language in a single simple object access protocol message: (1) association relationships between managed objects in atomic transactions; or (2) management relationships between atomic transactions and association relationships between managed objects in the atomic transactions.

Preferably, wherein, the managed objects comprise internal attributes and data processing, the internal attributes comprising resource identification and/or internal data structure, the data processing being an operation that can be executed on resources and/or an operation executed according to the internal data structure.

Preferably, executing one or more atomic transactions is specifically to execute each managed object in the atomic transactions.

Preferably, executing one or more atomic transactions is specifically to execute data processing contained in each managed object in the atomic transactions.

Preferably, further comprises operating the multiple atomic transactions as a separate atom operation or operating a part of the multiple atomic transactions as a separate atom operation.

According to a fourth aspect of the present invention, there is provided a transmitting apparatus for simultaneously transmitting multiple managed objects, characterized in that, the apparatus comprises: an encapsulating unit for encapsulating two or more managed objects in one or more atomic transactions according to internal attributes and data processing of the managed objects, wherein each atomic transaction includes at least two managed objects; a determining unit for, according to a pre-defined association rule, determining association relationships between managed objects in the one atomic transaction, or determining association relationships between multiple atomic transactions and association relationships between managed objects in each of the multiple atomic transactions; and a transmitting unit for transmitting one or more atomic transactions through a communication network.

According to a fifth aspect of the present invention, there is provided a receiving apparatus for simultaneously receiving multiple managed objects, characterized in that, the apparatus comprises: a receiving unit for receiving one or more atomic transactions through a communication network, wherein each atomic transaction includes at least two managed objects; a determining unit for, according to a pre-defined association rule, determining association relationships between managed objects in one atomic transaction, or determining association relationships between multiple atomic transactions and association relationships between managed objects in each of the multiple atomic transactions; and an executing unit for executing one or more atomic transactions according to the association relationships.

According to a sixth aspect of the present invention, there is provided a communication system, comprising:
 a transmitting apparatus for simultaneously transmitting multiple managed objects, comprising: an encapsulating unit for encapsulating two or more managed objects in one or more atomic transactions according to internal attributes and data processing of the managed objects, wherein each atomic transaction includes at least two managed objects; a determining unit for, according to a pre-defined association rule, determining association relationships between managed objects in the one atomic transaction, or determining association relationships between multiple atomic transactions and association relationships between managed objects in each of the multiple atomic transactions; and a transmitting unit for transmitting one or more atomic transactions through a communication network;
 a receiving apparatus for simultaneously receiving multiple managed objects, comprising: a receiving unit for receiving one or more atomic transactions through a communication network, wherein each atomic transaction includes at least two managed objects; a determining unit for, according to a pre-defined association rule, determining association relationships between managed objects in one atomic transaction, or determining association relationships between multiple atomic transactions and association relationships between managed objects in each of the multiple atomic transactions; and an executing unit for executing one or more atomic transactions according to the association relationships.

Preferably, wherein, the internal properties of the managed objects include resource identification and/or internal data structure.

Preferably, wherein, data processing of the managed objects is an operation that can be executed on resources and/or an operation executed according to the internal data structure.

Preferably, the transmitting unit transmits one or more atomic transactions through a single simple object access protocol message via a communication network.

Preferably, comprises using eXtensible Markup Language in a single simple object access protocol message to mark: (1) association relationships between managed objects in atomic transactions; or (2) management relationships between atomic transactions and association relationships between managed objects in the atomic transactions.

Preferably, the receiving unit receives a single simple object access protocol message via a communication network, the single simple object access protocol message comprising one or more atomic transactions.

Preferably, the determining unit determines, according to marks in eXtensible Markup Language in a single simple object access protocol message: (1) association relationships between managed objects in atomic transactions; or (2) management relationships between atomic transactions and association relationships between managed objects in the atomic transactions.

Preferably, the managed objects comprise internal attributes and data processing, the internal attributes comprising resource identification and/or internal data structure, the data processing being an operation that can be executed on resources and/or an operation executed according to the internal data structure.

Preferably, the executing unit executing one or more atomic transactions is specifically to execute each managed object in the atomic transactions.

Preferably, the executing unit executing one or more atomic transactions is specifically to execute data processing contained in each managed object in the atomic transactions.

Preferably, further comprises operating the multiple atomic transactions as a separate atom operation or operating a part of the multiple atomic transactions as a separate atom operation.

According to a seventh aspect of the present invention, there is provided an apparatus for simultaneously transmitting multiple managed objects, characterized in that, the apparatus comprises: means for encapsulating two or more managed objects in one or more atomic transactions according to internal attributes and data processing of the managed objects, wherein each atomic transaction includes at least two managed objects; means for, according to a pre-defined association rule, determining association relationships between managed objects in the one atomic transaction, or determining association relationships between multiple atomic transactions and association relationships between managed objects in each of the multiple atomic transactions; and means for transmitting one or more atomic transactions through a communication network.

According to an eighth aspect of the present invention, there is provided an apparatus for simultaneously receiving multiple managed objects, characterized by comprising: means for receiving one or more atomic transactions through a communication network, wherein each atomic transaction includes at least two managed objects; means for, according to a pre-defined association rule, determining association relationships between managed objects in one atomic transaction, or determining association relationships between multiple atomic transactions and association relationships between managed objects in each of the multiple atomic transactions; and means for executing one or more atomic transactions according to the association relationships.

According to a ninth aspect of the present invention, there is provided a computer program product stored on a storage medium, which when executed by a processor, causes: encapsulating two or more managed objects in one or more atomic transactions according to internal attributes and data processing of the managed objects, wherein each atomic transaction includes at least two managed objects; according to a pre-defined association rule, determining association relationships between managed objects in the one atomic transaction, or determining association relationships between multiple atomic transactions and association relationships between managed objects in each of the multiple atomic transactions; and transmitting one or more atomic transactions through a communication network.

According to a tenth aspect of the present invention, there is provided a computer program product stored on a storage medium, which when executed by a processor, causes: receiving one or more atomic transactions through a communication network, wherein each atomic transaction includes at least two managed objects; according to a pre-defined association rule, determining association relationships between managed objects in one atomic transaction, or determining association relationships between multiple atomic transactions and association relationships between managed objects in each of the multiple atomic transactions; and executing one or more atomic transactions according to the association relationships.

Many technologies introduced herein can be implemented by hardware, firmware, software, or combinations thereof. In one instance, the above technologies may be implemented in a computer program executed on a programmable computer, and each programmable computer includes a processor, processor-readable storage media (including volatile and nonvolatile memories and/or storage elements), and appropriate input and output apparatus. Program code is applied to data inputted by using an input apparatus, to thereby execute the described functions and to generate output information. The output information is applied to one or more output apparatus. Furthermore, it is preferable to use advanced process or object-oriented programming language to implement each program, so as to communicate with a computer system. However, if desired, assembly or machine language may be used to implement the above program. In any case, the language may be compiled or interpreted language.

BRIEF DESCRIPTION OF THE DRAWINGS

These and further features and advantages of the present invention may be better understood by reading the following detailed description of the preferred exemplary embodiments in conjunction with the accompanying drawings, wherein.

DETAILED DESCRIPTION OF THE INVENTION

Exemplary embodiments of the present invention are described now with reference to the accompanying drawings. However, the present invention can be implemented in many different forms, and is not limited to the embodiments described herein. These embodiments are provided in sequence for detailed and complete disclosure of the present invention, and in order to convey fully the scope of the present invention to those skilled in the art. Terms represented in the exemplary embodiments in the drawings are not intended to limit the present invention. In the drawings, like units/elements use like reference signs.

Unless otherwise indicated, "a" "one", "the" and "this", as used herein, also include the plural forms. Furthermore, it should be understood that terms "comprising", "including" and/or "containing" used in the present description specify some features, entities, steps, operations, units, and/or elements, but do not exclude one or more features, entities, steps, operations, units, elements, and/or groups composed of them. It should be understood that, when a unit is referred to as "connected" or "coupled" to another unit, it may be directly connected or coupled to another unit, and there may also be an intermediate unit. Furthermore, "connection" or "coupling" used herein includes wireless connection or coupling. As used herein, the term "and/or" includes any combination and all combinations of one or the associated items listed hereinabove.

Unless otherwise indicated, the terms used herein (including technical terminology) have generally understood meaning to those skilled in the art. In addition, it can be understood that a term defined in a generally used dictionary should be understood to have a consistent meaning as in a context of its related fields, but should not be understood in an idealized or overly formal sense.

Figure 1:
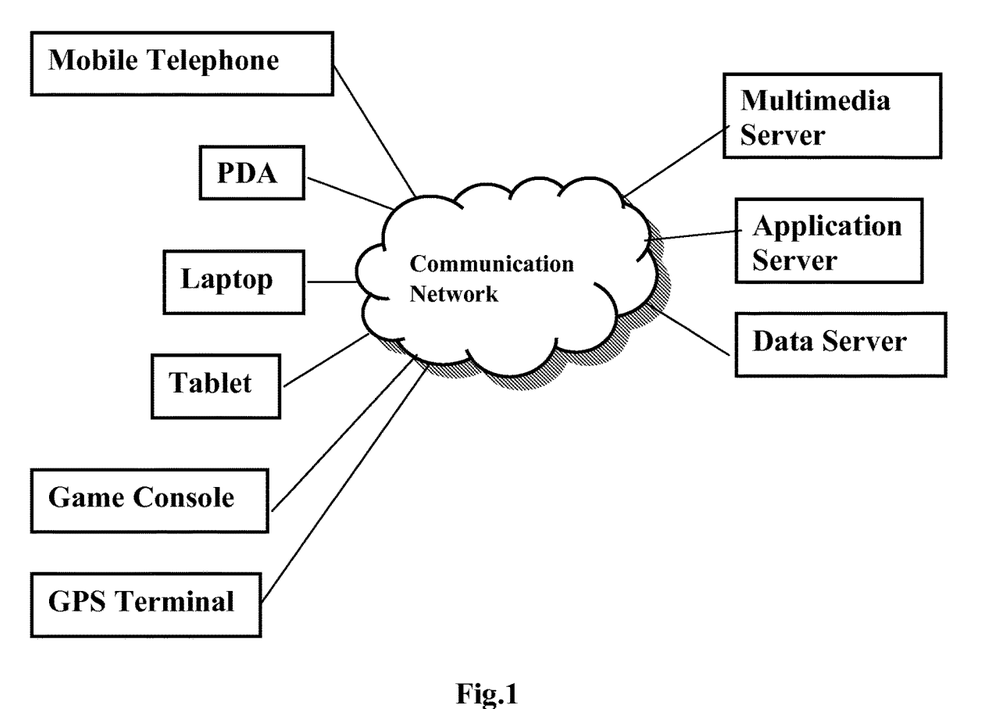
FIG. 1 illustrates a schematic structural diagram of a communication system according to an embodiment of the invention.

FIG. 1 illustrates a schematic structural diagram of a communication system according to an embodiment of the invention. As shown in FIG. 1, the communication system includes a communication network, user terminals and servers. Wherein, the user terminals include a variety of apparatus, which may be included in the following non-exhaustive list, such as mobile phones, personal digital assistants, mobile computers (e.g., laptop computers), tablet computers, game consoles, GPS terminals, etc. The communication network may be the Internet or some dedicated networks. The communication servers may be multimedia servers, application servers, data servers, etc.

Preferably, the user terminal may communicate with one or more servers through the communication network, or communicate with one or more other user terminals through the communication network. Preferably, the user terminal may transmit a managed object in a SOAP message to a server through the communications network, or vice versa. Preferably, the managed object contains one or more internal properties and one or more data processing. Wherein, the internal attributes represent names of resources involved in the data processing of the managed object (e.g., identifiers) and internal data structure. In one embodiment, for example, the internal attributes are Tables A and B of a database, wherein Table A has four records and Table B has seven records. The data processing represents operations executed on the resources and/or operations executed according to the internal data structure. For example, the managed object includes two data processing, adding one record in Table A and deleting one record, in Table B, respectively.

Preferably, the server receives the SOAP message and acquires the managed object, and operates according to internal attributes and data processing contained by the managed object. First, one record is added in Table A of the database so that Table A has five records, and then one record is deleted in Table B of the database so that Table B has six records. If the operation fails, for example, when the first data processing is executed successfully and then Table A has five records, while the second data processing execution fails or is not executed at all, then Table B still has seven records, that is, dirty data occurs in the database (i.e., newly added record in Table A). At this point, in order to maintain consistency, a rollback operation need to be executed, and the latest added record is deleted from Table A to restore it to its original state, that is, Table A has four records.

In the prior art, only one managed object can be processed as a separate transaction, that is, each transaction only includes one managed object. With increasingly high demands for data processing by the communications systems, it is desired to combine multiple managed objects into one transaction so that the transaction can execute more complete, complex and accurate data processing.

According to an embodiment of the present invention, two or more managed objects may be divided into one or more atomic transactions according to internal attributes and data processing of the managed objects, wherein each atomic transaction includes at least two managed objects, i.e., when there are only two or three managed objects, only one atomic transaction can be formed for processing. Preferably two or more managed objects may also be divided into one atomic transaction, that is, all the managed objects constitute one atomic transaction for processing. An atomic transaction represents a set of multiple transactions, and is used as one atomic operation. When multiple transactions in the atomic transaction are executed successfully, the atomic transaction is executed successfully; otherwise, as long as there is one transaction that fails or is not executed, the atomic transaction fails, and a rollback is executed. In addition, there is also a certain association relationship between managed objects in the atomic transaction. For example, the managed object A must be executed prior to the managed object B, or managed object E can only be executed after the managed objects C and D are executed successfully, and so on.

According to an embodiment of the present invention, multiple managed objects may also be divided into multiple atomic transactions, wherein each atomic transaction includes at least two managed objects. At this point, there is a certain association relationship between the multiple atomic transactions. For example, the atomic transaction A must be executed prior to the atomic transaction B, or atomic transaction E can only be executed after the atomic transactions C and D are executed successfully, and so on.

Preferably, an association rule is usually pre-defined in a communication system, for example, a read operation on a database table is executed after a write operation on the database table (or vice versa), a read operation on a database table is executed after a delete operation on the database table (or vice versa) and the like. Determining association relationships of an atomic transaction according to a pre-defined association rule is specifically to: when there is only one atomic transaction, determine association relationships between multiple managed objects in the atomic transaction according to the pre-defined association rule, and when there are multiple atomic transactions, determine association relationships between multiple atomic transactions and association relationships between managed objects in each of the multiple atomic transactions according to the pre-defined association rule. Preferably, when there are multiple atomic transactions, association relationships between multiple atomic transactions or association relationships between managed objects in each of the multiple atomic transactions may also be determined according to the pre-defined association rule.

After association relationships of the one or more atomic transactions is determined, the user terminal or server transmits one or more atomic transactions having the association relationship of the one or more atomic transactions is determined, the user terminal or server transmits one through a SOAP message via the communication network to other user terminals or servers.

According to an embodiment of the present invention, the user terminal or server receives one or more atomic transactions via a communication link, wherein each atomic transaction includes at least two managed objects. The user terminal or server determines, according to a pre-defined association rule, association relationships between managed objects in the atomic transaction, or determines association relationships between multiple atomic transactions and/or association relationships between managed objects in each of the multiple atomic transactions. Preferably, one or more atomic transactions are executed according to the association relationships.

Figure 2:
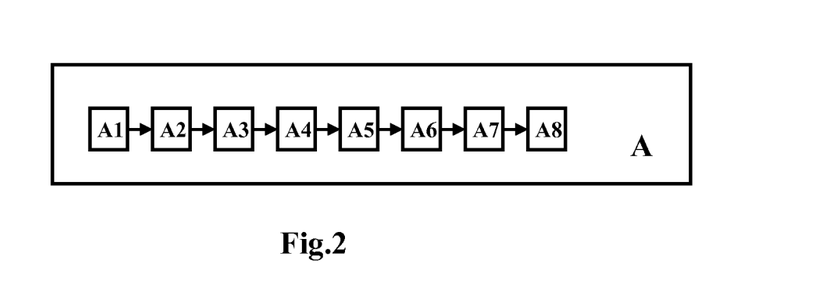
FIG. 2 illustrates a schematic diagram of making multiple managed objects form one atomic transaction according to the embodiment of the present invention.

FIG. 2 illustrates a schematic diagram of making multiple managed objects form one atomic transaction according to the embodiment of the present invention. Preferably, multiple managed objects can constitute one atomic transaction, the atomic transaction having ACID attributes, namely, Atomicity, Consistency, Isolation and Durability. When the atomic transaction failed, a "rollback" operation canceling all changes is executed. For example, as shown in FIG. 2, eight managed objects A1, A2, A3, A4, A5, A6, A7 and A8 are included, wherein each managed object includes internal attributes and data processing. Preferably, the eight managed objects are encapsulated into one atomic transaction A, and the eight managed objects may be sequenced or non-sequenced. Preferably, as shown in FIG. 2, the sequence of the eight managed objects is A1, A2, A3, A4, A5, A6, A7 and A8, that is, the eight managed objects must be executed in the above sequence. When the receiving party receives the atomic transaction A, it determines, according to a pre-defined association rule, that the association relationship of the eight managed objects is sequential execution, and then executes the atomic transaction A according to the sequence of A1, A2, A3, A4, A5, A6, A7, and A8.

Figure 3:
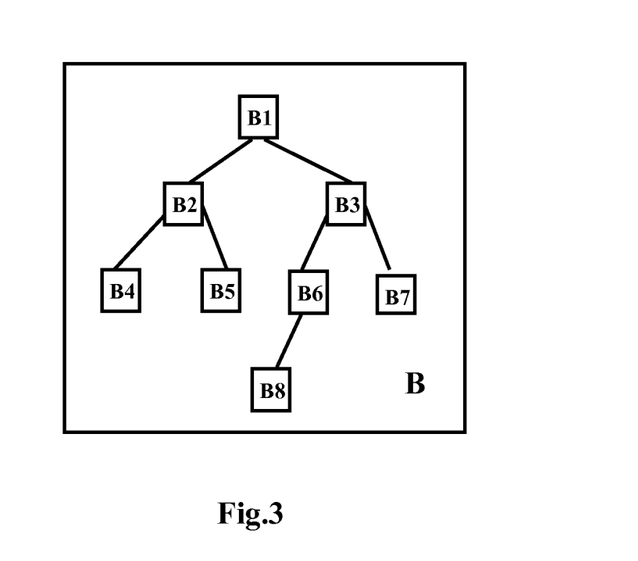
FIG. 3 illustrates a schematic diagram of making multiple managed objects form one atomic transaction according to another embodiment of the present invention.

FIG. 3 illustrates a schematic diagram of making multiple managed objects form one atomic transaction according to another embodiment of the present invention. As shown in FIG. 3, multiple managed objects constitute one atomic transaction B, the atomic transaction having ACID attributes, namely, Atomicity, Consistency, Isolation and Durability. When the atomic transaction failed, a "rollback" operation canceling all changes is executed. For example, as shown in FIG. 3, eight managed objects B1, B2, B3, B4, B5, B6, B7 and B8 are included, wherein each managed object includes internal attributes and data processing. Preferably, the eight managed objects are encapsulated into one atomic transaction B, and the eight managed objects form a tree-shape structure. Preferably, as shown in FIG. 3, when the pre-defined association rule is preorder traversal (DLR) and the sequence of the eight managed objects B1, B2, B4, B5, B3, B6, B8, B7, that is, the eight managed objects must be executed according to the above sequence; when the pre-defined association rule is inorder traversal (LDR), the sequence of the eight managed objects is B4, B2, B5, B1, B8, B6, B3, B7, that is, the eight managed objects must be executed according to the above sequence; when the pre-defined association rule is postorder traversal (LRD), the sequence of the eight managed objects is B4, B5, B2, B8, B6, B7, B3, B1, that is, the eight managed objects must be executed according to the above sequence; when the pre-defined association rule is levelorder traversal, the sequence of the eight managed objects is B1, B2, B3, B4, B5, B6, B7, B8, that is, the eight managed objects must be executed according to the above sequence. When the receiving party receives the atomic transaction B, it determines, according to the pre-defined association rule, i.e., preorder traversal, inorder traversal, postorder traversal or levelorder traversal, the association relationship of the eight managed objects, and then executes the atomic transaction B according to the sequence described hereinabove.

It should be noted that when all managed objects are encapsulated into one atomic transaction, the relationships between managed objects also include other cases, for example, a branched structure. For example, five managed objects are C1, C2, C3, C4 and C5, and the sequence for executing them is to execute C1 first, then execute C2, C3 (first C2 and then C3) in one branch while C4 in another branch, and after the execution of C3 is complete, execute C5. Therefore, those skilled in the art may determine association relationships between multiple managed objects according to the pre-defined association rule to, the association rule and association relationship are not limited to the above instances.

Figure 4:
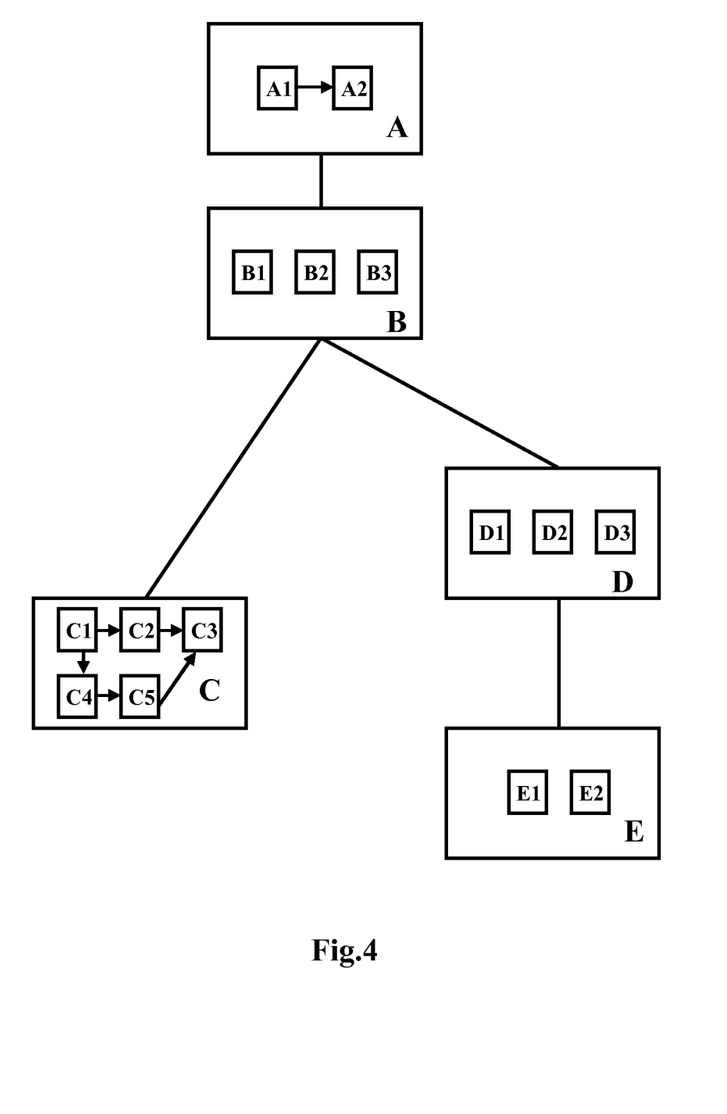
FIG. 4 illustrates a schematic diagram of dividing multiple managed objects into multiple atomic transactions according to the embodiment of the present invention.

FIG. 4 illustrates a schematic diagram of dividing multiple managed objects into multiple atomic transactions according to the embodiment of the present invention. As shown in FIG. 4, multiple managed objects constitute multiple atomic transactions, and the atomic transactions have ACID attributes as a whole, namely, Atomicity, Consistency, Isolation and Durability, that is, when any one atomic transaction failed, a "rollback" operation canceling all changes is executed. Furthermore, according to a preferred embodiment, the "rollback" operation canceling all changes is executed only when a part of multiple atomic transactions fails. For example, as shown in FIG. 4, five managed objects A, B, C, D, and E are included, wherein the atomic transaction A includes managed objects A1, A2, the atomic transaction B includes managed objects B1, B2, B3, the atomic transaction C includes managed objects C1, C2, C3, C4, C5, the atomic transaction D includes managed objects D1, D2, D3, the atomic transaction processing E includes managed objects E1 and E2, and wherein each managed object includes internal attributes and data processing.

As shown in FIG. 4, each atomic transaction encapsulates multiple managed objects. In the present embodiment, two association rules (relationships) are included:

(1) An association rule between atomic transactions. As shown in FIG. 4, the atomic transaction A is executed first, and then the atomic transaction B is executed, next on the one hand the atomic transaction C is executed while on the other hand, the atomic transaction D is executed first and then the atomic transaction E is executed, wherein the atomic transaction C is executed in parallel to the atomic transactions D and E.

(2) An association rule between managed objects inside atomic transactions. In the present embodiment, the pre-defined association rule of managed objects in the atomic transactions A and C is as shown in FIG. 4. In the atomic transaction A, the managed object A1 is executed first, and then the managed object A2 is executed. In the atomic transaction C, the managed object C1 is executed first, next on the one hand the managed object C4 is executed and then the managed object C5 is executed on the other hand, the managed object C2 is executed, and after the execution of managed objects C2 and C5 is complete, the managed object C3 is executed finally, wherein the managed objects C4 and C5 are executed in parallel to the manage object C2. In the present embodiment, the pre-defined association rule of managed objects in the atomic transactions B, D and E is as shown in FIG. 4, wherein the association rule between the managed objects is non-relationship, i.e., the managed objects in the atomic transactions B, D and E can be executed in any sequence.

According to a preferred embodiment of the present invention, in the case where multiple atomic transactions are comprised, and all the atomic transactions have ACID attributes as a whole, that is, when any one atomic transaction failed, a "rollback" operation canceling all changes is executed. Or, according to a preferred embodiment, a part of the atomic transactions has ACID attributes as a whole, and the "rollback" operation canceling all changes is executed only when a part of the multiple atomic transactions fails.

As shown in FIG. 4, five managed objects A, B, C, D, and E are included, and the five atomic transactions have ACID attributes as a whole, that is, the five atomic transactions constitute one new atomic transaction for processing. When any one of the five atomic transactions failed, a "rollback" operation canceling all changes is executed. For example, when the atomic transactions A, B, C and D are executed successfully but the atomic transaction E failed, then the "rollback" operation canceling all changes is executed to eliminate changes brought by the successful execution of the atomic transactions A, B, C and D.

According to another embodiment of the present invention, a part of the five atomic transactions have ACID attributes as a whole, that is, a part of the five atomic transactions constitutes one new atomic transaction. As shown in FIG. 4, the atomic transactions A, B, D and E in the atomic transactions A, B, C, D and E constitute a new atomic transaction X, and any one in the new atomic transaction X fails, the "rollback" operation canceling all changes is executed. For example, when any one of the atomic transactions A, B, D and E (e.g., E) fails, the "rollback" operation canceling all changes is executed to eliminate changes brought by the successful execution of the atomic transactions A, B and D. However, if all of the atomic transactions A, B, D and E are executed successfully, regardless of whether the atomic transaction C is executed successfully, the "rollback" operation will not be executed.

Figure 5:
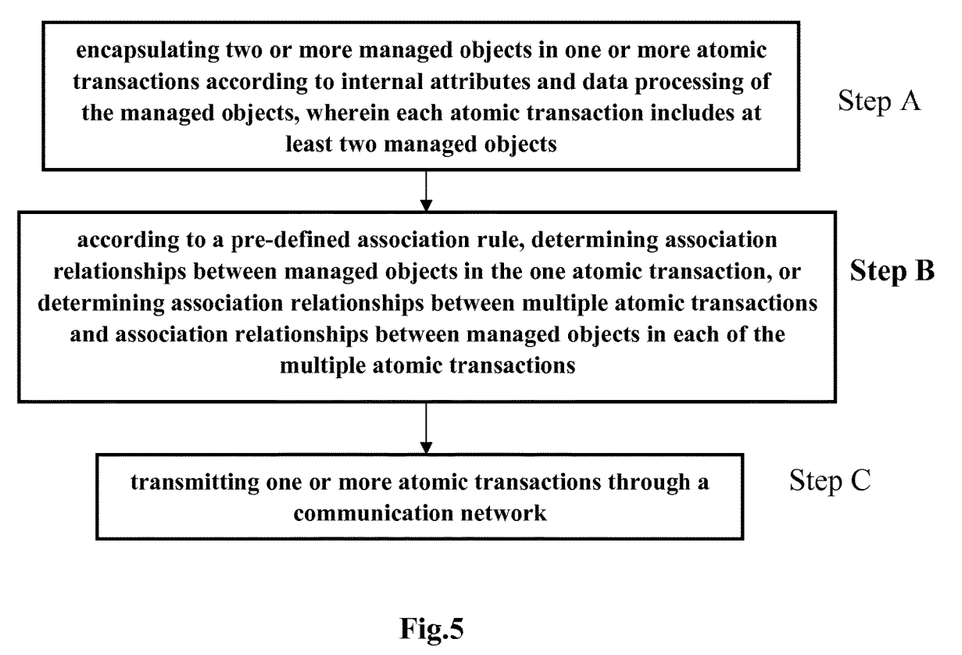
FIG. 5 illustrates a flowchart of a method for simultaneously transmitting multiple managed objects according to the embodiment of the present invention.

FIG. 5 illustrates a flowchart of a method for simultaneously transmitting multiple managed objects according to the embodiment of the present invention. The method comprises the following steps: step A of encapsulating two or more managed objects in one or more atomic transactions according to internal attributes and data processing of the managed objects, wherein each atomic transaction includes at least two managed objects; step B of, according to a pre-defined association rule, determining association relationships between managed objects in the one atomic transaction, or determining association relationships between multiple atomic transactions and association relationships between managed objects in each of the multiple atomic transactions; and step C of transmitting one or more atomic transactions through a communication network.

Figure 6:
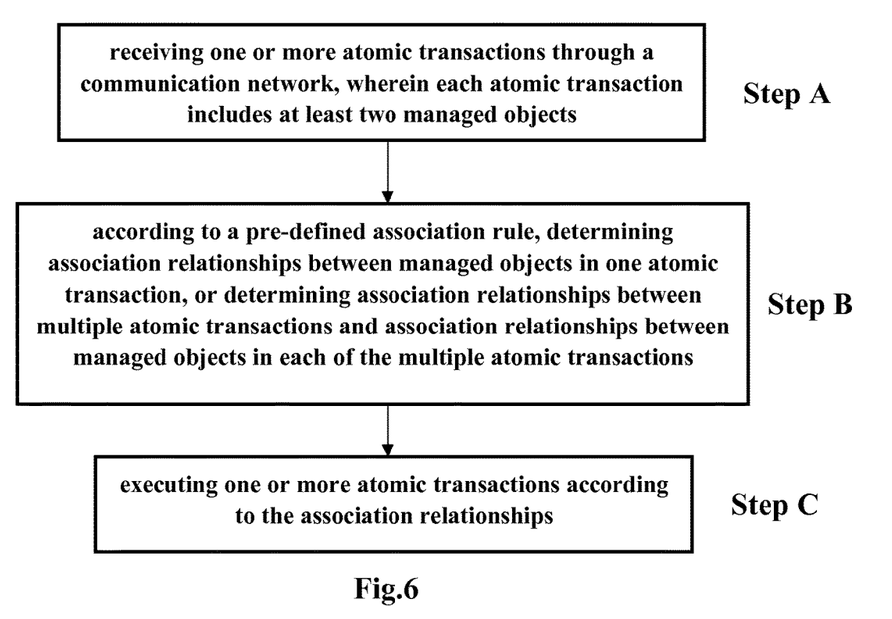
FIG. 6 illustrates a flowchart of a method for simultaneously receiving multiple managed objects according to the embodiment of the present invention.

FIG. 6 illustrates a flowchart of a method for simultaneously receiving multiple managed objects according to the embodiment of the present invention. The method comprises the following steps: step A of receiving one or more atomic transactions through a communication network, wherein each atomic transaction includes at least two managed objects; step B of, according to a pre-defined association rule, determining association relationships between managed objects in one atomic transaction, or determining association relationships between multiple atomic transactions and association relationships between managed objects in each of the multiple atomic transactions; and step C of executing one or more atomic transactions according to the association relationships.

Figure 7:
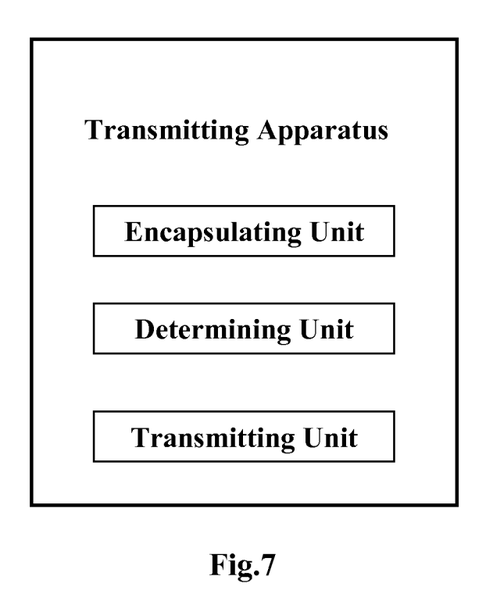
FIG. 7 illustrates a structural diagram of a transmitting apparatus for simultaneously transmitting multiple managed objects according to the embodiment of the present invention.

FIG. 7 illustrates a structural diagram of a transmitting apparatus for simultaneously transmitting multiple managed objects according to the embodiment of the present invention. The transmitting apparatus comprises: an encapsulating unit for encapsulating two or more managed objects in one or more atomic transactions according to internal attributes and data processing of the managed objects, wherein each atomic transaction includes at least two managed objects; a determining unit for, according to a pre-defined association rule, determining association relationships between managed objects in the one atomic transaction, or determining association relationships between multiple atomic transactions and association relationships between managed objects in each of the multiple atomic transactions; and a transmitting unit for transmitting one or more atomic transactions through a communication network.

Figure 8:
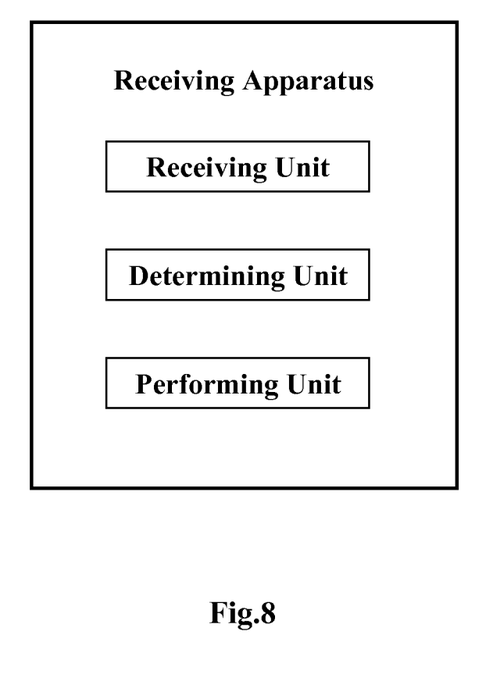
FIG. 8 illustrates a structural diagram of a receiving apparatus for simultaneously receiving multiple managed objects according to the embodiment of the present invention.

FIG. 8 illustrates a structural diagram of a receiving apparatus for simultaneously receiving multiple managed objects according to the embodiment of the present invention. The receiving apparatus comprises: a receiving unit for receiving one or more atomic transactions through a communication network, wherein each atomic transaction includes at least two managed objects; a determining unit for, according to a pre-defined association rule, determining association relationships between managed objects in one atomic transaction, or determining association relationships between multiple atomic transactions and association relationships between managed objects in each of the multiple atomic transactions; and an executing unit for executing one or more atomic transactions according to the association relationships.

The present invention has been described with reference to a small number of embodiments. However, it is well known to those skilled in the art that, as defined in the accompanying patent claims, other embodiments besides those disclosed in the present invention equivalently fall within the scope of the present invention.

Generally, all terms used in the claims are interpreted as their ordinary meaning in the technical field, unless explicitly defined otherwise. All references "a/the/this [means, components, etc.]" are to be interpreted openly as at least one instance in the means, components and the like, unless explicitly defined otherwise. There's no need to run the steps of any of the methods disclosed herein in a disclosed accurate sequence, unless clearly stated.

In the foregoing detailed description, the accompanying drawings forming part of the present invention are referred to, and specific embodiments that may implement the present invention are shown by way of example in the drawings. These examples and some variants thereof have been sufficiently described in detail, so that those skilled in the art can implement the present invention. It can be understood that, without departing from the spirit or scope of the present invention, other suitable embodiments can be used and logical, mechanical, chemical and electrical changes may be made. To avoid unnecessary details, information well known to those skilled in the art is omitted in the description. Therefore, the previous detailed description is not intended to be limited as specific form described in the description; instead, it is intended to cover these alternatives, modifications, and equivalents thereof that may be reasonably included within the spirit and scope of the appended claims.

The invention claimed is:

1. A method for simultaneously transmitting multiple managed objects, the method comprising:

encapsulating the multiple managed objects, which include at least two non-sequenced managed objects arranged in a tree structure, in one or more atomic transactions according to internal attributes and data processing of the managed objects, wherein each atomic transaction includes at least two managed objects;

according to a pre-defined association rule, determining association relationships between managed objects in the one atomic transaction, or determining association relationships between multiple atomic transactions and association relationships between managed objects in each of the multiple atomic transactions; and transmitting one or more atomic transactions through a single simple object access protocol message via a communication network, wherein the transmitting further comprises transmitting an association relationship of the managed objects and the pre-defined association rule used to determine the association relationship of the managed objects and the pre-defined association rule, the pre-defined association rule being one of preorder traversal, inorder traversal, postorder traversal and levelorder traversal, wherein the pre-defined association rule defines a sequence of execution of one or more atomic transactions;

wherein data processing of the managed objects is at least one of an operation that can be executed on resources and an operation executed according to an internal data structure.

2. The method according to claim 1, wherein, one or more internal properties of the managed objects include resource identification and internal data.

3. The method according to claim 2, further comprising using eXtensible Markup Language in a single simple object access protocol message to mark: association relationships between managed objects in atomic transactions; or management relationships between atomic transactions and association relationships between managed objects in the atomic transactions.

4. A method for simultaneously receiving multiple managed objects, the method comprising:

receiving one or more atomic transactions through a communication network, wherein each atomic transaction includes the multiple managed objects, which include at least two non-sequenced managed objects arranged in a tree structure;

according to a pre-defined association rule, determining association relationships between managed objects in one atomic transaction, or determining association relationships between multiple atomic transactions and association relationships between managed objects in each of the multiple atomic transactions;

executing one or more atomic transactions according to the association relationships; and receiving a single simple object access protocol message via a communication network, wherein the single simple object access protocol message comprises one or more atomic transactions, an association relationship of the managed objects and the pre-defined association rule used to determine the association relationship of the managed objects and the pre-defined association rule, the pre-defined association rule being one of preorder traversal, inorder traversal, postorder traversal and levelorder traversal, wherein the pre-defined association rule defines a sequence of execution of one or more atomic transactions;

the data processing being one or more of an operation that can be executed on resources and an operation executed according to an internal data structure further comprising operating the multiple atomic transactions as a separate atom operation or operating a part of the multiple atomic transactions as a separate atom operation.

5. The method according to claim 4, further comprising determining, according to marks in eXtensible Markup Language in a single simple object access protocol message: association relationships between managed objects in atomic transactions; or management relationships between atomic transactions and association relationships between managed objects in the atomic transactions.

6. The method according to claim 4, wherein, the managed objects comprise internal attributes and data processing, the internal attributes comprising resource identification and internal data structure.

7. A transmitting apparatus for simultaneously transmitting multiple managed objects, the apparatus comprising:
one or more processors configured to:
encapsulate the multiple managed objects, which include at least two non-sequenced managed objects arranged in a tree structure, in one or more atomic transactions according to internal attributes and data processing of the managed objects, wherein each atomic transaction includes at least two managed objects; and
according to a pre-defined association rule, determine association relationships between managed objects in the one atomic transaction, or determine association relationships between multiple atomic transactions and association relationships between managed objects in each of the multiple atomic transactions; and
a transmitter configured to transmit one or more atomic transactions through a single simple object access protocol message via a communication network, along with an association relationship of the managed objects, and the pre-defined association rule used to determine the association relationship of the managed objects and the pre-defined association rule, the pre-defined association rule being one of preorder traversal, inorder traversal, postorder traversal and levelorder traversal, wherein the pre-defined association rule defines a sequence of execution of the managed objects of one or more atomic transactions;
wherein data processing of the managed objects is at least one of an operation that can be executed on resources and an operation executed according to an internal data structure.

8. The apparatus according to claim 7, wherein, one or more internal properties of the managed objects include resource identification and internal data structure.

9. The apparatus according to claim 8, further comprising using eXtensible Markup Language in a single simple object access protocol message to mark: association relationships between managed objects in atomic transactions; or management relationships between atomic transactions and association relationships between managed objects in the atomic transactions.

10. A receiving apparatus for simultaneously receiving multiple managed objects, the apparatus comprising:
a receiver configured to receive one or more atomic transactions through a communication network, wherein each atomic transaction includes the multiple managed objects, which include at least two non-sequenced managed objects arranged in a tree structure;
one or more processors configured to:
according to a pre-defined association rule, determine association relationships between managed objects in one atomic transaction, or determine association relationships between multiple atomic transactions and association relationships between managed objects in each of the multiple atomic transactions; and
execute one or more atomic transactions according to the association relationships; and
wherein the receiver receives a single simple object access protocol message via a communication network, the single simple object access protocol message comprising one or more atomic transactions, an association relationship of the managed objects and the pre-defined association rule used to determine the association relationship of the managed objects and the pre-defined association rule, the pre-defined association rule being one of preorder traversal, inorder traversal, postorder traversal and levelorder traversal, wherein the pre-defined association rule defines a sequence of execution of one or more atomic transactions;
the data processing being at least one of an operation that can be executed on resources and an operation executed according to an internal data structure and further comprising operating the multiple atomic transactions as a separate atom operation or operating a part of the multiple atomic transactions as a separate atom operation.

11. The apparatus according to claim 10, wherein the one or more processors are further configured to determine, according to marks in eXtensible Markup Language in a single simple object access protocol message: association relationships between managed objects in atomic transactions; or management relationships between atomic transactions and association relationships between managed objects in the atomic transactions.

12. The apparatus according to claim 10, wherein, the managed objects comprise internal attributes and data processing, the internal attributes comprising resource identification and/or internal data structure.

* * * * *